United States Patent
Liu et al.

(10) Patent No.: US 11,905,998 B2
(45) Date of Patent: Feb. 20, 2024

(54) TRANSMISSION SHAFT AUTOMATIC CONNECTION AND DISENGAGEMENT DEVICE AND TEST EQUIPMENT

(71) Applicant: CITIC Dicastal Co., Ltd., Qinhuangdao (CN)

(72) Inventors: Qiang Liu, Qinhuangdao (CN); Chenguang Wei, Qinhuangdao (CN); Zhihua Zhu, Qinhuangdao (CN); Alateng, Qinhuangdao (CN); Zhigao Yin, Qinhuangdao (CN); Zuo Xu, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 325 days.

(21) Appl. No.: 17/368,212

(22) Filed: Jul. 6, 2021

(65) Prior Publication Data
US 2022/0316532 A1 Oct. 6, 2022

(30) Foreign Application Priority Data
Apr. 1, 2021 (CN) .......................... 2021103538285

(51) Int. Cl.
*F16D 1/112* (2006.01)
*F16D 1/10* (2006.01)
(Continued)

(52) U.S. Cl.
CPC ........... *F16D 1/112* (2013.01); *G01M 13/025* (2013.01); *F16D 7/048* (2013.01); *F16D 2001/103* (2013.01)

(58) Field of Classification Search
CPC . F16D 1/112; F16D 7/04; F16D 7/042; F16D 7/044; F16D 7/046; F16D 7/048;
(Continued)

(56) References Cited

U.S. PATENT DOCUMENTS 447,413 A * 3/1891 Perry .................. F16D 43/2024
464/39
1,126,219 A * 1/1915 Hupp ..................... F16D 7/044
464/38
(Continued)

FOREIGN PATENT DOCUMENTS

DE 2433995 A1 * 2/1975 ............. F16D 7/044
DE 29815913 U1 * 10/1999 ............. F16D 7/044
(Continued)

*Primary Examiner* — Josh Skroupa
(74) *Attorney, Agent, or Firm* — IPro, PLLC

(57) ABSTRACT

A transmission shaft automatic connection and disengagement device and test equipment. An input shaft drives a transmission shaft to rotate through a second connection shaft, a ratchet assembly, a first connection shaft and an output shaft so as to apply an acceleration torque, gears of the input shaft and the first connection shaft can be completely engaged and completely separated through extension and retraction of piston rods of a first group of air cylinders and a second group of air cylinders so as to achieve an effect that when a driving shaft needs to perform driving, a power system gets involved, and after driving is completed, the power system is cut off, and through the ratchet assembly, the transmission shaft can be prevented from driving a motor to work in reverse.

14 Claims, 2 Drawing Sheets

(51) Int. Cl.
*F16D 7/04* (2006.01)
*G01M 13/025* (2019.01)

(58) Field of Classification Search
CPC .............. F16D 43/202; F16D 43/2022; F16D 43/2024; F16D 43/2026; F16D 43/2028
See application file for complete search history.

(56) References Cited

U.S. PATENT DOCUMENTS

| | | | | |
|---|---|---|---|---|
| 2,764,416 | A * | 9/1956 | Martin | F16D 7/044 |
| | | | | 408/139 |
| 5,366,412 | A * | 11/1994 | Beaty | F16D 7/044 |
| | | | | 464/37 |
| 6,053,293 | A * | 4/2000 | Sato | F16D 7/044 |
| | | | | 192/69.82 |
| 9,610,896 | B2 * | 4/2017 | Lang | F16D 7/04 |
| 10,883,300 | B2 * | 1/2021 | Wittelsburger | F16D 7/044 |
| 2007/0267266 | A1 * | 11/2007 | Lee-Liao | F16D 7/044 |
| | | | | 464/39 |

FOREIGN PATENT DOCUMENTS

| | | | | | |
|---|---|---|---|---|---|
| DE | 10162561 | A1 * | 7/2003 | ............. | F16D 7/044 |
| FR | 412190 | A * | 7/1910 | ............. | F16D 7/044 |
| FR | 1135245 | A * | 4/1957 | ......... | F16D 43/2028 |

\* cited by examiner

TRANSMISSION SHAFT AUTOMATIC CONNECTION AND DISENGAGEMENT DEVICE AND TEST EQUIPMENT

TECHNICAL FIELD

The present application relates to the technical field of tests of wheels and automobile chassis suspension systems, in particular to a transmission shaft automatic connection and disengagement device and test equipment.

BACKGROUND

For a road simulation tester with a suspension, a system needs to be accelerated firstly in some tests, and when a preset speed is achieved, an acceleration torque is removed so as to facilitate performing the subsequent tests. However, in existing test equipment, a driving shaft and a power system applying the acceleration torque are integrally designed, it often needs to start up to apply the acceleration torque and shut down to stop the acceleration torque, the driving shaft and the power system cannot be separated, the power system may influence accuracy of an entire test result in a test with a plurality of loading variables and a plurality of combination parts, and the plurality of variables are not convenient to load; and meanwhile, a cooperative test is not conveniently performed on the plurality of parts. In addition, if a rotation speed of the driving shaft is higher than that of the power system, the power system may be damaged; and meanwhile, the power system may limit loading of the acceleration torque and other variables, consequently the accuracy of the test result is influenced, and the real test result cannot be obtained.

SUMMARY

Embodiments of the present application provide a transmission shaft automatic connection and disengagement device and test equipment, which can solve problems in the background art.

In order to achieve the above objective, the present disclosure provides the following technical solutions:

In the first aspect, a transmission shaft automatic connection and disengagement device is provided and includes an output shaft, a first connection shaft, a ratchet assembly, a second connection shaft and an input shaft, wherein an upper end of the output shaft is connected with a transmission shaft, and a lower end of the output shaft is of a gear structure;

an upper end of the first connection shaft is of a gear structure, and the gear structure of the upper end of the first connection shaft can be engaged with the gear structure of the lower end of the output shaft; a lower end of the first connection shaft is connected with the upper end of the ratchet assembly through a spline, and an upper end of the second connection shaft is connected with a lower end of the ratchet assembly through a spline; the ratchet assembly can transfer rotation of the second connection shaft to the first connection shaft, and prevent rotation of the first connection shaft from being transferred to the second connection shaft; and a lower end of the second connection shaft is connected with the input shaft, and the input shaft is configured to input rotation power.

In some embodiments, the ratchet assembly includes a ratchet cover, a first baffle, a ratchet, a pawl, a first group of air cylinders and a second group of air cylinders. The first connection shaft penetrates through the first baffle, and the lower end of the first connection shaft is connected with the ratchet through a spline; the first connection shaft is provided with a first-connection-shaft shaft shoulder, a clamping hoop is fixed on the first connection shaft below the first-connection-shaft shaft shoulder, the first baffle is positioned between the first-connection-shaft shaft shoulder and the clamping hoop, and the first baffle can freely rotate around the first connection shaft; the first baffle and a top surface of the ratchet cover are fixedly connected together; the ratchet and the pawl are fixed in the ratchet cover, and a lower end of the ratchet cover is connected with the second connection shaft through a spline; and positions of the first group of air cylinders and the second group of air cylinders are fixed, the first group of air cylinders are positioned above the first baffle, the second group of air cylinders are positioned below the ratchet cover, piston rods of the first group of air cylinders can push the first baffle, and piston rods of the second group of air cylinders can push the ratchet cover.

In some embodiments, a second baffle is fixed at a bottom end of the first connection shaft, a third baffle is fixed at a top end of the second connection shaft, and a gap is reserved between the second baffle and the third baffle.

In some embodiments, chamfers are formed at tooth tops of both the gear structure of the upper end of the first connection shaft and the gear structure of the lower end of the output shaft.

In some embodiments, the number of the air cylinders in the first group of air cylinders and the number of the air cylinders in the second group of air cylinders are the same and are both 2 to 4, and the first group of air cylinders and the second group of air cylinders are peripherally and uniformly distributed and longitudinally symmetrically mounted.

In some embodiments, a gap is reserved between the first baffle and the first connection shaft in a radial direction, and gaps are reserved between the first baffle and the clamping hoop as well as between the first baffle and the first-connection-shaft shaft shoulder in an axial direction.

In some embodiments, the number of teeth of the ratchet is 16 to 24, and the teeth of the ratchet are peripherally and uniformly distributed; and the number of the pawls is 2 to 4, and the pawls are peripherally and uniformly distributed and mounted in the ratchet cover.

In some embodiments, a spline length between the second connection shaft and the ratchet cover and a spline length between the first connection shaft and the ratchet can ensure that gears between the first connection shaft and the output shaft can be completely engaged and completely disengaged.

In the second aspect, an embodiment of the present application provides test equipment, including a driving motor and the transmission shaft automatic connection and disengagement device in any one of the above embodiments. An output shaft of the driving motor is fixedly connected with the input shaft.

Compared with the prior art, the present disclosure has the beneficial effects that:

The present disclosure provides the transmission shaft automatic connection and disengagement device and the test equipment. The transmission shaft automatic connection and disengagement device includes the output shaft, the first connection shaft, the ratchet assembly, the second connection shaft and the input shaft. The input shaft drives a transmission shaft to rotate through the second connection shaft, the ratchet assembly, the first connection shaft and the output shaft so as to apply an acceleration torque; the gears of the input shaft and the first connection shaft can be completely engaged and completely separated by extension and retraction of the piston rods of the first group of air cylinders and the second group of air cylinders so as to achieve an effect that when a driving shaft needs to perform driving, a power system gets involved, and after driving is completed, the power system is automatically cut off; moreover, by the ratchet assembly, the transmission shaft can be prevented from driving a motor to work in reverse; in addition, the first baffle is pushed by using the first group of air cylinders, so that the first baffle and the first connection shaft move relatively; and the first connection shaft drives the ratchet to ascend in the ratchet cover so that the ratchet and the pawl can be automatically disengaged to prevent the ratchet from being excessively worn. According to the test equipment in the present application, a loading test of a plurality of variables and a cooperative test of a plurality of parts are facilitated, and the accuracy of a test result is high; and meanwhile, the driving shaft can be prevented from dragging the motor of the power system to rotate, and the power system is prevented from being damaged and the accuracy of the test result is prevented from being affected.

DETAILED DESCRIPTION OF THE EMBODIMENTS

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Embodiment 1

Figure 1:
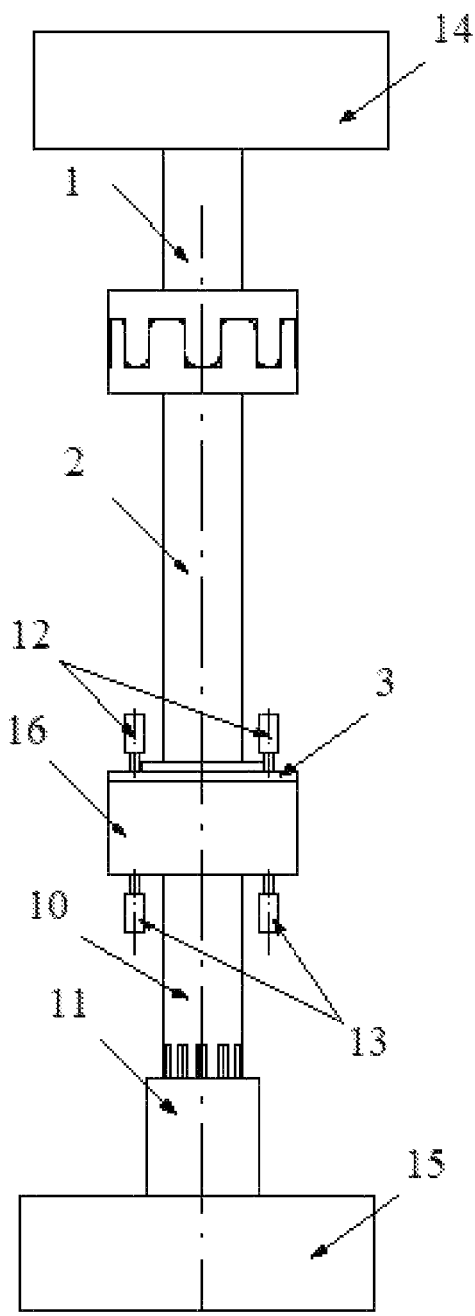
FIG. 1 is a structural schematic diagram of a transmission shaft automatic connection and disengagement device according to the present application.
Figure 2:
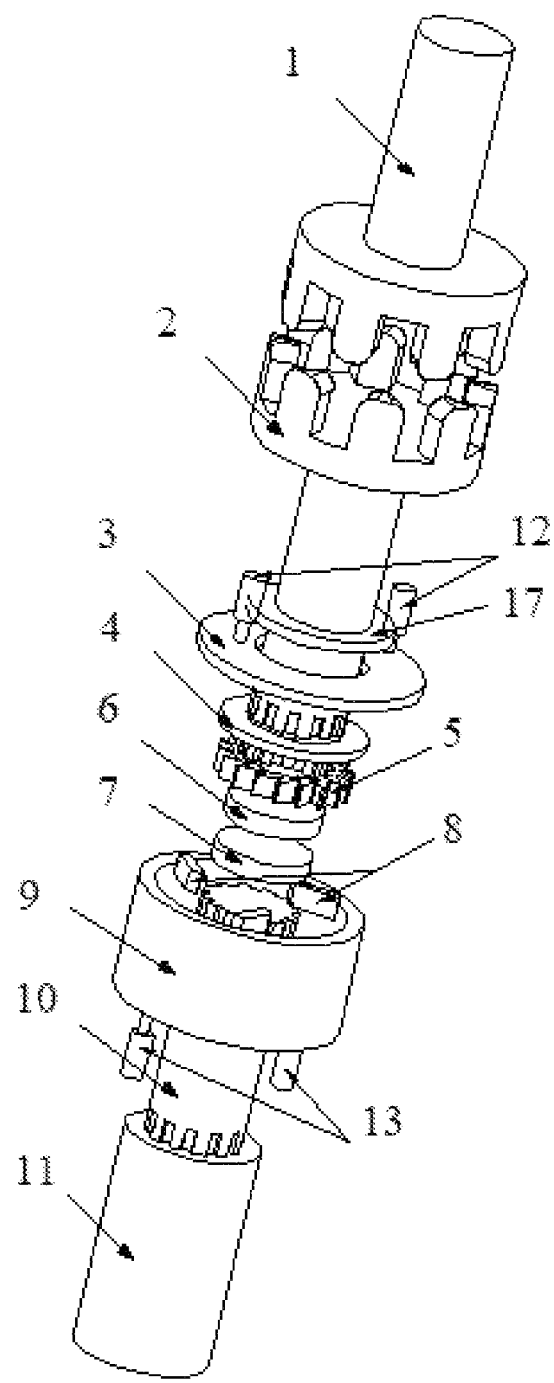
FIG. 2 is a schematic diagram of an assembly structure of a transmission shaft automatic connection and disengagement device according to the present application, wherein 1-output shaft,
2-first connection shaft,
3-first baffle,
4-clamping hoop,
5-ratchet,
6-second baffle,
7-third baffle,
8-pawl,
9-ratchet cover,
10-second connection shaft,
11-input shaft,
12-first group of air cylinders,
13-second group of air cylinders,
14-transmission shaft,
15-driving motor,
16-ratchet assembly,
and 17-first-connection-shaft shaft shoulder.

The Embodiment 1 provides a transmission shaft automatic connection and disengagement device, with reference to FIGS. 1-2, including an output shaft 1, a first connection shaft 2, a first baffle 3, a ratchet assembly 16, a second connection shaft 10, an input shaft 11, a first group of air cylinders 12 and a second group of air cylinders 13. An upper end of the output shaft 1 is connected with a transmission shaft 14 (e.g., a transmission shaft of an automobile suspension assembly), and a lower end of the output shaft 1 is of a gear structure. An upper end of the first connection shaft 2 is of a gear structure, the gear structure of the upper end of the first connection shaft 2 can be engaged with the gear structure of the lower end of the output shaft 1 for power transmission. As shown in FIGS. 1-2, after the gear structure of the upper end of the first connection shaft 2 is engaged with the gear structure of the lower end of the output shaft 1, axes of the first connection shaft 2 and the output shaft 1 coincide. The numbers of gear teeth of both the gear structure of the upper end of the first connection shaft 2 and the gear structure of the lower end of the output shaft 1 are 8 to 16, the teeth are uniformly distributed along the respective circumferences, and in addition, chamfers are formed at the tops of the teeth of both the gear structure of the upper end of the first connection shaft 2 and the gear structure of the lower end of the output shaft 1, so that gears can be engaged together at any positions.

In other embodiments, the gear structure of the upper end of the first connection shaft and the gear structure of the lower end of the output shaft may further be in different engaged transmission modes, e.g., internal engaged transmission, cone gear transmission, herringbone gear transmission, straight toothed spur gear and the like.

A lower end of the first connection shaft 2 is connected with an upper end of the ratchet assembly 16 through a spline, an upper end of the second connection shaft 10 is connected with a lower end of the ratchet assembly 16 through a spline, a lower end of the second connection shaft 10 is connected with an upper end of the input shaft 11 through a spline, and spline connection enables the ratchet assembly 16 to move in an axial direction relative to the first connection shaft 2 and the second connection shaft 4 under the action of the air cylinders. The ratchet assembly 16 can transfer rotation of the second connection shaft 4 to the first connection shaft 2, and prevent rotation of the first connection shaft 2 from being transferred to the second connection shaft 4. The lower end of the second connection shaft 10 is connected with the input shaft 11, the input shaft 11 is configured to input rotation power, and in this embodiment, the output end of a driving motor 15 is connected with the input shaft 11, as shown in FIGS. 1-2.

As shown in FIG. 2, the ratchet assembly 16 includes a ratchet cover 9, a first baffle 3, a ratchet 5, a pawl 8, a first group of air cylinders 12 and a second group of air cylinders 13. The first connection shaft 2 penetrates through the first baffle 3, and the lower end of the first connection shaft 2 is connected with the ratchet 5 through a spline. The first connection shaft 2 is provided with a first-connection-shaft shaft shoulder 17, a clamping hoop 4 is fixed to the first connection shaft 2 below the first-connection-shaft shaft shoulder 17, the first baffle 3 is positioned between the first-connection-shaft shaft shoulder 17 and the clamping hoop 4, and the first baffle 3 can freely rotate around the first connection shaft 2. The first baffle 3 is fixed to a top surface of the ratchet cover 9 through a bolt, the pawl is mounted on an inner side of the ratchet cover 9, the ratchet 5 and the pawl 8 are fixed in the ratchet cover 9, and the ratchet 5 and the pawl 8 are configured to prevent the transmission shaft 14 from dragging the driving motor 15 connected to the input shaft 11 to rotate. A lower end of the ratchet cover 9 is connected with the second connection shaft 10 through a spline. Positions of the first group of air cylinders 12 and the second group of air cylinders 13 are fixed, the first group of air cylinders 12 are positioned above the first baffle 3, piston rods of the first group of air cylinders 12 are not fixedly connected with the first baffle 3, the second group of air cylinders 13 are positioned below the ratchet cover 16, piston rods of the first group of air cylinders 12 are not fixedly connected with the ratchet cover 16, the piston rods of the first group of air cylinders 12 can push the first baffle 3, and the piston rods of the second group of air cylinders 13 can push the ratchet cover 16.

The ratchet assembly 16 can transfer rotation of the second connection shaft 4 to the first connection shaft 2, and the first baffle 3 can rotate along the first connection shaft 2, so that rotation of the first connection shaft 2 can be prevented from being transferred to the second connection shaft 10. As shown in FIGS. 1-2, the first-connection-shaft shaft shoulder 17 is positioned on the first connection shaft 2, the clamping hoop 4 and the first connection shaft 2 are fixed together through a bolt, a gap is reserved between the first-connection-shaft shaft shoulder 17 and the clamping hoop 4, and then the first baffle 3 can be successfully mounted without being clamped, so that when rotating, the first connection shaft 2 cannot drive the first baffle 3 to rotate together. The positions of the first group of air cylinders 12 and the second group of air cylinders 13 are fixed, and both the first group of air cylinders 12 and the second group of air cylinders 13 are fixed to a working table.

The number of teeth of the ratchet 12 is 16 to 24, and the teeth of the ratchet 12 are peripherally and uniformly distributed; and the number of the pawls 15 is 2 to 4, and the pawls 15 are peripherally and uniformly distributed and mounted in the ratchet cover 9. A second baffle 6 is fixed at a bottom end of the first connection shaft 2, and the second baffle 6 is configured to prevent the ratchet 5 from falling off. A third baffle 7 is fixed at a top end of the second connection shaft 10, and the third baffle 7 is configured to prevent the upper end of the second connection shaft 10 from falling out of the ratchet cover 9.

The number of the air cylinders in the first group of air cylinders 12 and the number of the air cylinders in the second group of air cylinders 13 are the same and are both 2 to 4, and the first group of air cylinders 12 and the second group of air cylinders 13 are peripherally and uniformly distributed and longitudinally symmetrically mounted. The first group of air cylinders 12 are acted on the first baffle 3, the second group of air cylinders 13 is acted on the ratchet cover, and automatic connection and disengagement between the first connection shaft 2 and the output shaft 1 are achieved.

An air cylinder stroke in the first group of air cylinders 12 and the second group of air cylinders 13 is 60 mm to 100 mm, and the air cylinder stroke needs to meet the requirement that the gears of the output shaft 1 and the first connection shaft 2 can be completely engaged and completely separated. In order to avoid friction between the first baffle 3, the first-connection-shaft shaft shoulder 17 on the first connection shaft 2 and the clamping hoop 4, gaps are reserved between the first-connection-shaft shaft shoulder 17 and the first baffle 3 as well as between the the clamping hoop 4 and the first baffle 3 and for example, are 1 mm to 2 mm, and a gap is also reserved between the first baffle 3 and the first connection shaft 2 and for example, is 1 mm to 2 mm.

According to the transmission shaft automatic connection and disengagement device in this embodiment, when automatic connection needs to be carried out, the second group of air cylinders 13 are inflated, the first group of air cylinders are deflated, the second group of air cylinders 13 pushes the ratchet cover 9 to move upwards, the ratchet cover 9 pushes the first baffle 3, and the first baffle 3 drives the first connection shaft 2 to move upwards by pushing the first-connection-shaft shaft shoulder 17, so that the gear at the upper end of the first connection shaft 2 and the gear at the lower end of the output shaft 1 are engaged together. The driving motor 15 drives the input shaft 11 to rotate, the input shaft 11 drives the second connection shaft 10 to rotate, the second connection shaft 10 drives the ratchet cover 9 to work through the spline, the pawl 8 mounted on the ratchet cover 9 drives the ratchet 5 to work, the ratchet 5 drives the first connection shaft 2 through the spline, the first connection shaft 2 drives the output shaft 1 through the gear, and the output shaft 1 drives the transmission shaft 14 to rotate.

When the second group of air cylinders 13 push the ratchet cover 9, the third baffle 7 is positioned at an upper end of the spline connecting the ratchet cover 9 with the second connection shaft 10, so that the ratchet cover 9 does not fall off. When the first baffle 3 pushes the first connection shaft 2, a bottom of the spline connecting the lower end of the first connection shaft 2 with the ratchet 5 is fixed through the second baffle 6 so as to prevent the ratchet from slipping off.

A spline length between the second connection shaft 10 and the input shaft 11 and a spline length between the first connection shaft 2 and the ratchet 5 can ensure that the gears between the first connection shaft 2 and the output shaft 1 can be completely engaged and completely disengaged, and a certain allowance is reserved.

A gap of 5 mm to 10 mm is reserved between the second baffle 6 and the third baffle 7 after mounting is completed.

When a transmission system works to rotate, the whole set of system synchronously rotates, after the speed of a wheel reaches a preset speed, the driving motor 15 stops working, the input shaft 11, the second connection shaft 10, the ratchet cover 9, the pawl 8 and the third baffle 7 all stop rotating, at the moment, the first baffle 3 and the ratchet cover 9 are fixed together through the bolt, but the gap is reserved between the first baffle 3 and the first connection shaft 2, and the gaps are reserved between the first baffle 3 and the first-connection-shaft shaft shoulder 17 as well as between the first baffle 3 and the clamping hoop 4, so that the first baffle 10 further stops rotating and wear with a rotating portion cannot be generated. At the moment, the first group of air cylinders 12 are inflated, the second group of air cylinders 13 are deflated, the first group of air cylinders 12 push the first baffle 3 to move downwards, the first baffle 3 pushes the ratchet cover 9 to move downwards, the ratchet cover 9 pushes the second connection shaft 10 to move downwards, and at the same time, the first baffle 10 drives the first connection shaft 2 to move downwards through the clamping hoop 4, so that the gears between the first connection shaft 2 and the output shaft 1 are automatically disengaged.

Embodiment 2

The Embodiment 2 provides test equipment, including a driving motor and the transmission shaft automatic connection and disengagement device in the above Embodiment 1. An output shaft of the driving motor is fixedly connected with an input shaft. The test equipment in Embodiment 2 achieves an effect that when a driving shaft needs to perform driving, a power system gets involved, and after driving is completed, the power system is automatically cut off, and through the ratchet assembly, the transmission shaft can be prevented from driving the motor to work in reverse. According to the test equipment in the present application, a loading test of a plurality of variables and a cooperative test of a plurality of parts are facilitated, and the accuracy of a test result is high; and meanwhile, the driving shaft can be prevented from dragging the motor of the power system to rotate, and the power system is prevented from being damaged and the accuracy of the test result is prevented from being affected.

What is claimed is:

1. A transmission shaft automatic connection and disengagement device, comprising an output shaft, a first connection shaft, a ratchet assembly, a second connection shaft and an input shaft, wherein an upper end of the output shaft is connected with a transmission shaft, and a lower end of the output shaft is of a gear structure;

an upper end of the first connection shaft is of a gear structure, and the gear structure of the upper end of the first connection shaft can be engaged with the gear structure of the lower end of the output shaft; a lower end of the first connection shaft is connected with an upper end of the ratchet assembly through a spline, and an upper end of the second connection shaft is connected with a lower end of the ratchet assembly through a spline; the ratchet assembly can transfer rotation of the second connection shaft to the first connection shaft, and prevent rotation of the first connection shaft from being transferred to the second connection shaft; and a lower end of the second connection shaft is connected with the input shaft, and the input shaft is configured to input rotation power, wherein the ratchet assembly comprises a ratchet cover, a first baffle, a ratchet, a pawl, a first group of air cylinders and a second group of air cylinders;

the first connection shaft penetrates through the first baffle, and the lower end of the first connection shaft is connected with the ratchet through a spline;

the first connection shaft is provided with a first-connection-shaft shaft shoulder, a clamping hoop is fixed to the first connection shaft below the first-connection-shaft shaft shoulder, the first baffle is positioned between the first-connection-shaft shaft shoulder and the clamping hoop, and the first baffle can freely rotate around the first connection shaft;

the first baffle and a top surface of the ratchet cover are fixedly connected together;

the ratchet and the pawl are fixed in the ratchet cover, and a lower end of the ratchet cover is connected with the second connection shaft through a spline; and positions of the first group of air cylinders and the second group of air cylinders are fixed, the first group of air cylinders are positioned above the first baffle, the second group of air cylinders are positioned below the ratchet cover, piston rods of the first group of air cylinders can push the first baffle, and piston rods of the second group of air cylinders can push the ratchet cover.

2. The transmission shaft automatic connection and disengagement device according to claim 1, wherein a second baffle is fixed at a bottom end of the first connection shaft, a third baffle is fixed at a top end of the second connection shaft, and a gap is reserved between the second baffle and the third baffle.

3. The transmission shaft automatic connection and disengagement device according to claim 2, wherein chamfers are formed at tooth tops of both the gear structure of the upper end of the first connection shaft and the gear structure of the lower end of the output shaft.

4. The transmission shaft automatic connection and disengagement device according to claim 2, wherein the number of the air cylinders in the first group of air cylinders and the number of the air cylinders in the second group of air cylinders are the same and are both 2 to 4, and the first group of air cylinders and the second group of air cylinders are peripherally and uniformly distributed and longitudinally symmetrically mounted.

5. The transmission shaft automatic connection and disengagement device according to claim 2, wherein a gap is reserved between the first baffle and the first connection shaft in a radial direction, and gaps are reserved between the first baffle and the clamping hoop as well as between the first baffle and the first-connection-shaft shaft shoulder in an axial direction.

6. The transmission shaft automatic connection and disengagement device according to claim 2, wherein the number of teeth of the ratchet is 16 to 24, and the teeth of the ratchet are peripherally and uniformly distributed; and the number of the pawls is 2 to 4, and the pawls are peripherally and uniformly distributed and mounted in the ratchet cover.

7. The transmission shaft automatic connection and disengagement device according to claim 2, wherein a spline length between the second connection shaft and the ratchet cover and a spline length between the first connection shaft and the ratchet can ensure that gears between the first connection shaft and the output shaft can be completely engaged and completely disengaged.

8. The transmission shaft automatic connection and disengagement device according to claim 1, wherein chamfers are formed at tooth tops of both the gear structure of the upper end of the first connection shaft and the gear structure of the lower end of the output shaft.

9. The transmission shaft automatic connection and disengagement device according to claim 1, wherein chamfers are formed at tooth tops of both the gear structure of the upper end of the first connection shaft and the gear structure of the lower end of the output shaft.

10. The transmission shaft automatic connection and disengagement device according to claim 1, wherein the number of the air cylinders in the first group of air cylinders and the number of the air cylinders in the second group of air cylinders are the same and are both 2 to 4, and the first group of air cylinders and the second group of air cylinders are peripherally and uniformly distributed and longitudinally symmetrically mounted.

11. The transmission shaft automatic connection and disengagement device according to claim 1, wherein a gap is reserved between the first baffle and the first connection shaft in a radial direction, and gaps are reserved between the first baffle and the clamping hoop as well as between the first baffle and the first-connection-shaft shaft shoulder in an axial direction.

12. The transmission shaft automatic connection and disengagement device according to claim 1, wherein the number of teeth of the ratchet is 16 to 24, and the teeth of the ratchet are peripherally and uniformly distributed; and the number of the pawls is 2 to 4, and the pawls are peripherally and uniformly distributed and mounted in the ratchet cover.

13. The transmission shaft automatic connection and disengagement device according to claim 1, wherein a spline length between the second connection shaft and the ratchet cover and a spline length between the first connection shaft and the ratchet can ensure that gears between the first connection shaft and the output shaft can be completely engaged and completely disengaged.

14. Test equipment, comprising a driving motor and the transmission shaft automatic connection and disengagement device according to claim 1, and an output shaft of the driving motor is fixedly connected with an input shaft.

* * * * *